US007736035B2

(12) United States Patent
Chinniah et al.

(10) Patent No.: US 7,736,035 B2
(45) Date of Patent: Jun. 15, 2010

(54) SEVEN INCH ROUND LED HEADLAMP

(75) Inventors: Jeyachandrabose Chinniah, Belleville, MI (US); Edwin Mitchell Sayers, Saline, MI (US); Kyle Lucas, Livonia, MI (US); Todd Patterson, Belleville, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 12/030,577

(22) Filed: Feb. 13, 2008

(65) Prior Publication Data

US 2009/0201692 A1 Aug. 13, 2009

(51) Int. Cl.
*B60Q 1/00* (2006.01)

(52) U.S. Cl. ...................................... 362/507; 362/475

(58) Field of Classification Search ................. 362/464, 362/465, 466, 475, 507, 509, 510, 514, 516, 362/517, 518, 531, 532, 538, 543, 544, 545, 362/546, 547

See application file for complete search history.

(56) References Cited

U.S. PATENT DOCUMENTS 6,367,949 B1 4/2002 Pederson
6,520,669 B1 * 2/2003 Chen et al. .................. 362/545
6,565,247 B2 5/2003 Thominet et al.
6,657,393 B2 * 12/2003 Natsume ...................... 315/82
6,830,364 B2 * 12/2004 Ter-Oganesian ............ 362/518
6,953,264 B2 * 10/2005 Ter-Hovhannisian ........ 362/241
7,070,310 B2 7/2006 Pond et al.
7,186,010 B2 3/2007 Coushaine et al.
7,258,473 B2 * 8/2007 Okamura et al. ............ 362/545
7,275,848 B2 10/2007 Chinniah et al.
7,384,176 B2 * 6/2008 Ishida ........................ 362/545
7,401,960 B2 * 7/2008 Pond et al. .................. 362/545
2002/0093820 A1 7/2002 Pederson
2006/0098450 A1 5/2006 Iwasaki
2006/0139942 A1 6/2006 Pond et al.
2006/0262551 A1 11/2006 Fallahi et al.
2007/0189017 A1 8/2007 Hofmann
2007/0236952 A1 10/2007 Chinniah et al.

FOREIGN PATENT DOCUMENTS

DE 198 13 032 A1 9/1999
DE 10 2007 024 962 A1 12/2007

* cited by examiner

*Primary Examiner*—Hargobind S Sawhney
(74) *Attorney, Agent, or Firm*—Fraser Clemens Martin & Miller LLC; J. Douglas Miller

(57) ABSTRACT

An LED headlamp is disclosed, wherein the headlamp is a replacement for a seven inch headlamp. The headlamp includes a housing adapted to replace any conventional seven inch round headlamp, a first light source adapted to be coupled to a source of electrical energy, a second light source adapted to be coupled to a source of electrical energy, a first optical system disposed adjacent the first light source, wherein the first optical system is adapted to provide a low beam lighting pattern, a second optical system disposed adjacent the second light source, wherein the second optical system is adapted to provide a high beam lighting pattern, and a cover lens coupled to the housing for enclosing the first light source, the second light source, the first optical system, and the second optical system within the housing.

4 Claims, 4 Drawing Sheets

SEVEN INCH ROUND LED HEADLAMP

FIELD OF THE INVENTION

The present invention relates to automotive lighting. More particularly, the invention is directed to a seven inch round LED headlamp for replacement of a conventional seven inch round headlamp.

BACKGROUND OF THE INVENTION

Vehicle headlamps are typically required to include both a low beam mode and a high beam mode. Multiple vehicular applications, including military vehicles, continue to utilize the formerly standard seven (7) inch round headlamp configuration to fulfill the forward illumination functions of the low beam mode and the high beam mode.

More recently, light emitting diodes (LEDs) have been used as a light source in vehicle headlamps. With the introduction of LED forward lighting technology, there is both a desire and a need for effective incorporation of LED lighting technology to replace conventional tungsten and halogen headlamps. The standard sealed-beam lamp has relatively poor performance by passenger vehicle standards and the halogen lamp, while average in performance, has relatively high power consumption.

It would be desirable to have an LED headlamp incorporating LEDs for both the low beam mode and the high beam mode, wherein the LED headlamp is a direct one-for-one replacement for a seven inch headlamp.

SUMMARY OF THE INVENTION

Concordant and consistent with the present invention, an LED headlamp incorporating LEDs for both the low beam mode and the high beam mode, wherein the LED headlamp is a direct one-for-one replacement for a seven inch headlamp, has surprisingly been discovered.

In one embodiment, a headlamp comprises a housing adapted to be received in a mounting system for a seven inch round headlamp; a first light source adapted to be coupled to a source of electrical energy and provide a first desired lighting pattern; a second light source adapted to be coupled to a source of electrical energy and provide a second desired lighting pattern; and a cover lens coupled to the housing for enclosing the first light source and the second light source.

In another embodiment, a headlamp for a vehicle comprises a housing adapted to be received in a mounting system for a seven inch round headlamp; a first light source adapted to be coupled to a source of electrical energy; a second light source adapted to be coupled to a source of electrical energy; a first optical system disposed adjacent the first light source, wherein the first optical system is adapted to provide a first desired lighting pattern; a second optical system disposed adjacent the second light source, wherein the second optical system is adapted to provide a second desired lighting pattern; and a cover lens coupled to the housing for enclosing the first light source, the second light source, the first optical system, and the second optical system within the housing.

In another embodiment, a headlamp for a vehicle comprises a housing adapted to be received in a mounting system for a seven inch round headlamp; a first light source adapted to be coupled to a source of electrical energy; a second light source adapted to be coupled to a source of electrical energy; a first optical system disposed adjacent the first light source, wherein the first optical system is adapted to provide a low beam lighting pattern; a second optical system disposed adjacent the second light source, wherein the second optical system is adapted to provide a high beam lighting pattern; and a cover lens coupled to the housing for enclosing the first light source, the second light source, the first optical system, and the second optical system within the housing.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1A:
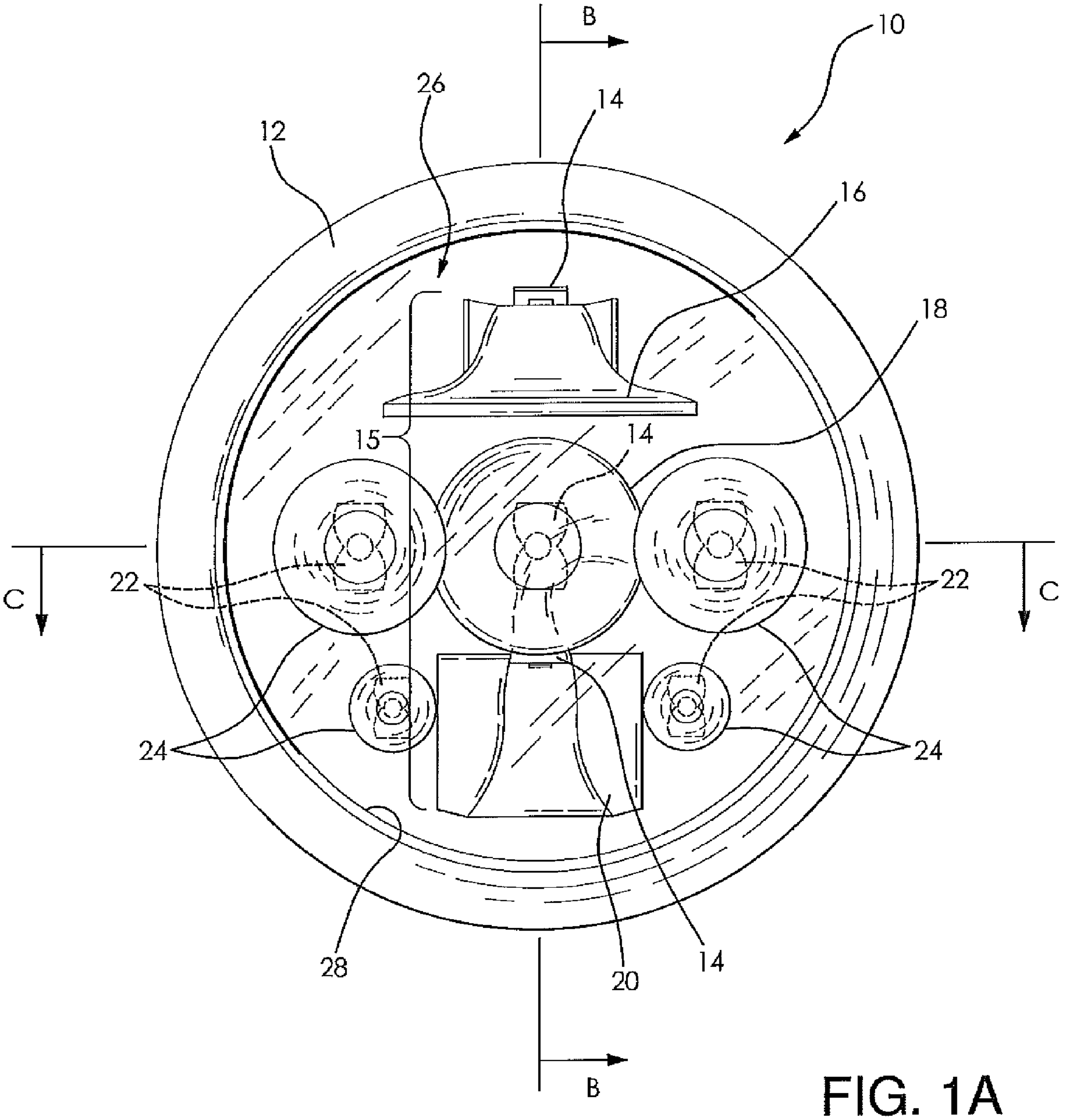
FIG. 1A is a front elevational view of a headlamp according to an embodiment of the present invention.
Figure 1B:
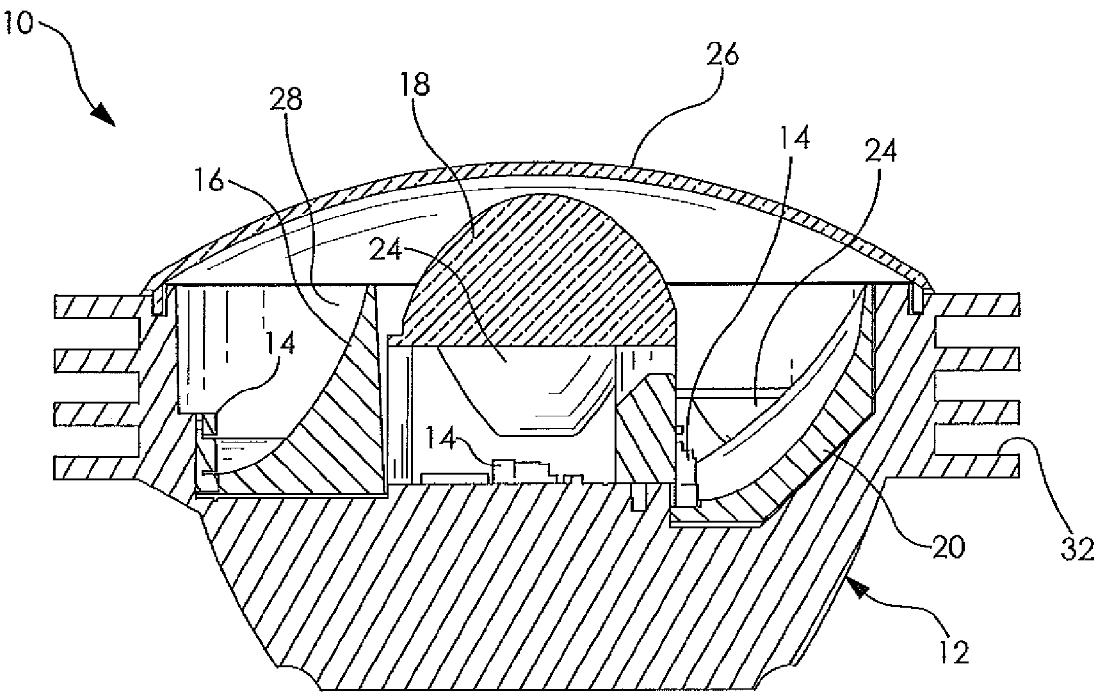
FIG. 1B is a side cross sectional view of the headlamp of FIG. 1*a* taken across line B-B.
Figure 1C:
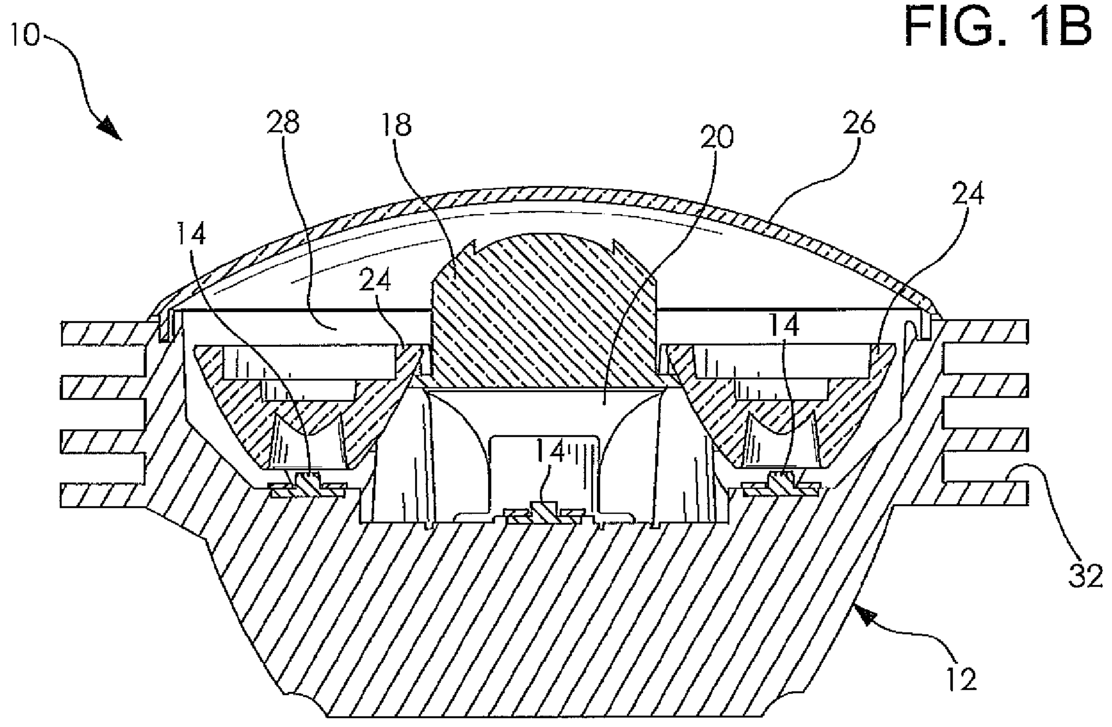
FIG. 1C is a top cross sectional view of the headlamp of FIG. 1*a* taken across line C-C.
Figure 2:
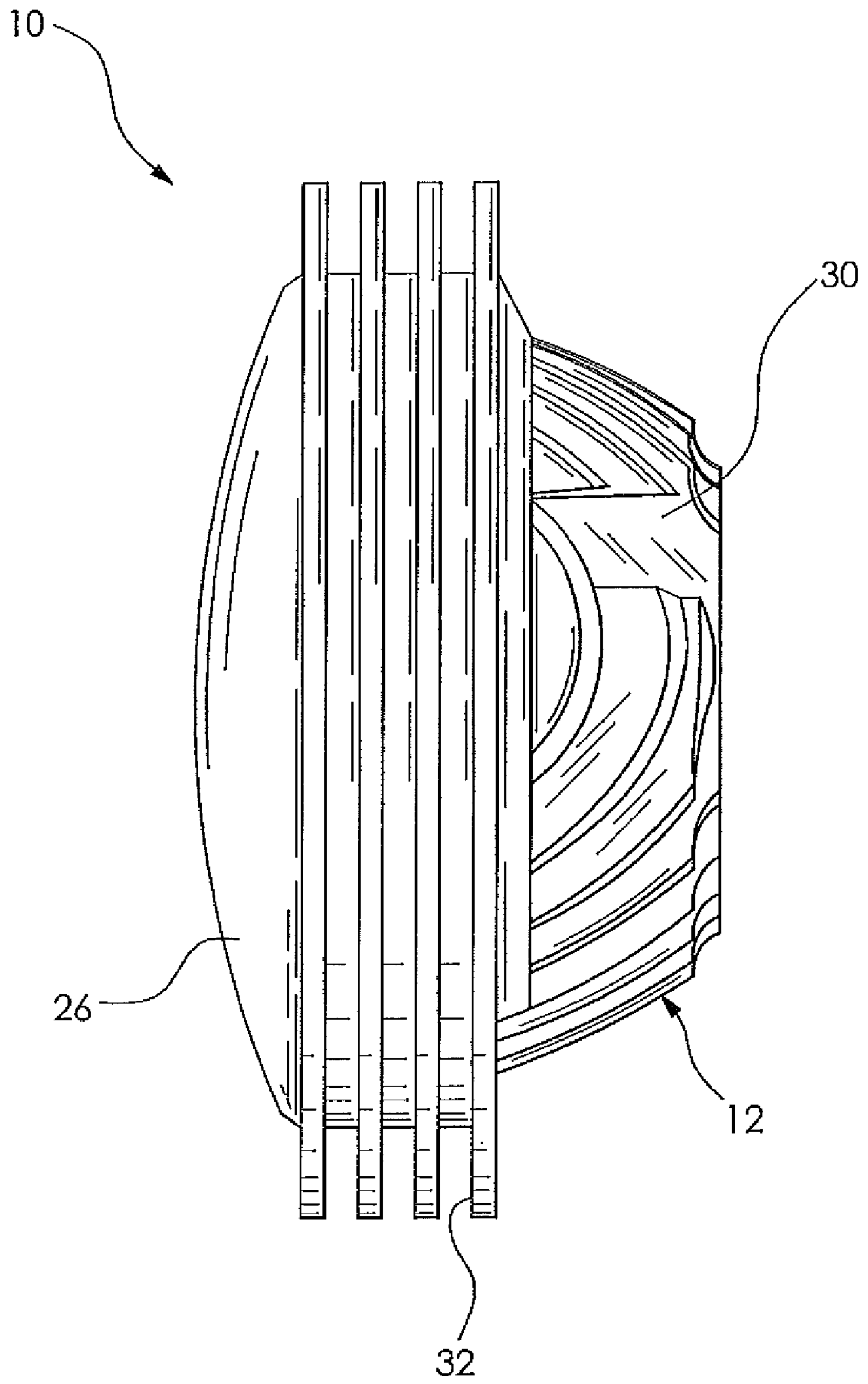
FIG. 2 is a side elevational view of the headlamp of FIG. 1.

The following detailed description and appended drawings describe and illustrate various embodiments of the invention. The description and drawings serve to enable one skilled in the art to make and use the invention, and are not intended to limit the scope of the invention in any manner.

FIGS. 1A-1C and 2 illustrate a headlamp 10 according to an embodiment of the present invention. The headlamp 10 includes a housing 12, a first light source 14, a first optical system 15, a second light source 22, a second optical system 24, and a cover lens 26. The headlamp 10 is adapted to be coupled to a vehicle (not shown) as a replacement of a conventional seven inch round headlamp, without the need for costly or impractical modification to the vehicle or the headlamp 10.

The housing 12 is a seven inch round headlamp housing adapted to be received in a vehicle mounting system (not shown) for a seven inch round headlamp. It is understood that any convention means for coupling the housing 12 to the mounting system may be used, as desired. The housing 12 defines an inner surface 28 and an outer surface 30 of the headlamp 10. It is understood that the headlamp may also include a thermal management device 32, also known as a heatsink. As more clearly shown in FIG. 2, the thermal management device 32 is disposed adjacent the outer surface 30 of the housing 12, and is adapted to dissipate heat from the headlamp 12. It is understood that the thermal management device 32 may be any conventional means of dissipating heat from the headlamp 12, as desired.

The first light source 14 is disposed adjacent the inner surface 28 of the housing 12. The first light source 14 is shown as a plurality of LED packages disposed along a central axis of the housing 12. Although the first light source 14 is shown as three LEDs, it is understood that any number of LEDs may be used, as desired. It is further understood that additional light emitting elements may be included such as LED-based infrared emitters for night vision, for example. The first light source 14 is further adapted for electrical communication with a source of electrical energy (not shown).

The first optical system 15 is disposed adjacent the first light source 14 to provide a desired first lighting pattern. As shown, the first optical system 15 includes a first optical device 16, a second optical device 18, and a third optical device 20. Although the first optical system 15 is shown as including three optical devices 16, 18, 20, it is understood that any number of optical devices may be used, as desired. The first optical device 16 is disposed adjacent an LED of the first light source 14. As shown, the first optical device 16 is a trough reflector adapted to direct the light emitted from the LED of the first light source 14 in a desired lighting pattern. It is understood that the first optical device 16 may be any conventional optical device for directing light rays such as a condenser lens, a projector lens, a direct lens, and a near field lens, for example. The second optical device 18 is disposed adjacent an LED of the first light source 14. As shown, the second optical device 18 is a condenser lens adapted to direct the light emitted from the LED of the first light source 14 in a desired lighting pattern. It is understood that the second optical device 18 may be any conventional optical device for directing light rays such as a projector lens, a reflector, a direct lens, and a near field lens, for example. The third optical device 20 is disposed adjacent an LED of the first light source 14. As shown, the third optical device 20 is a trough reflector adapted to direct the light emitted from the LED of the first light source 14 in a desired lighting pattern. It is understood that the third optical device 20 may be any conventional optical device for directing light rays such as a condenser lens, a projector lens, a direct lens, and a near field lens, for example.

The second light source 22 is disposed adjacent the inner surface 28 of the housing 12. The second light source 22 is shown as a plurality of LED packages disposed adjacent the inside perimeter of the housing 12. Although the second light source 22 is shown as four LEDs, it is understood that any number of LEDs may be used, as desired. It is further understood that additional light emitting elements may be included such as LED-based infrared emitters for night vision, for example. The second light source 22 is further adapted for electrical communication with a source of electrical energy (not shown).

The second optical system 24 is disposed adjacent the second light source 22 to provide a second desired lighting pattern. Although the second optical system 24 is shown as four near field lenses, it is understood that the second optical system 24 may include any conventional optical devices such as a reflector, a projector, a condenser lens, and a direct lens, for example.

The cover lens 26 is coupled to the housing 12 of the headlamp 10 to enclose the inner surface 28, the first light source 14, the first optical system 15, the second light source 22, and the second optical system 24. As shown, the cover lens 26 is formed from a clear glass. However, it is understood that any conventional material may be used, as desired.

In use in a low beam mode, the first light source 14 emits light, which is directed by the first optical system 15 into a first desired lighting pattern. As shown, the first optical system 15 is adapted to provide a lighting pattern consistent with a low beam lighting pattern. It is understood that the first optical system 15 may be adapted to provide any lighting pattern, as desired.

Figure 3A:
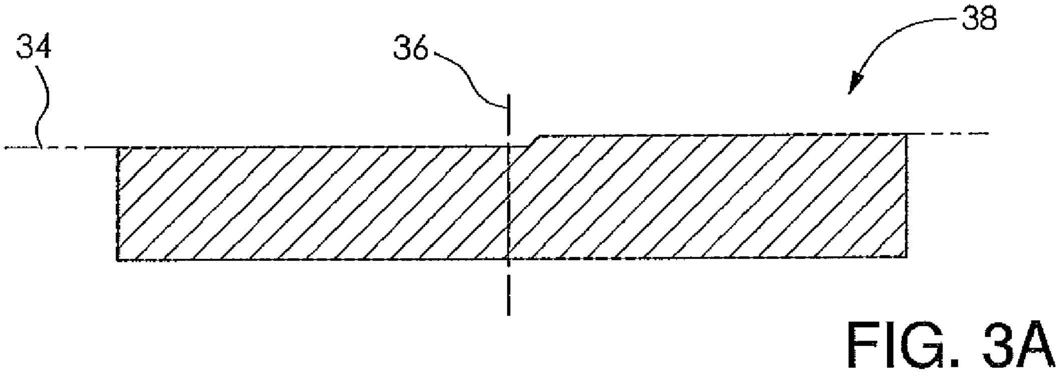
FIG. 3A is a view of a luminous intensity distribution pattern constituting a lighting pattern for a low beam mode formed by irradiating light from a first optical device.
Figure 3B:
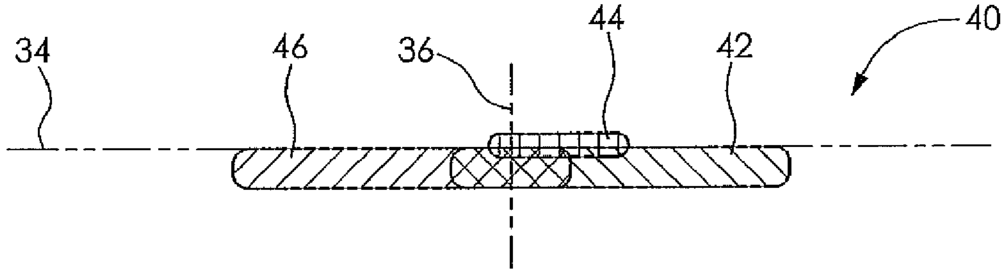
FIG. 3B is a view of another luminous intensity distribution pattern constituting a lighting pattern for a low beam mode formed by irradiating light from a second optical device.
Figure 3C:
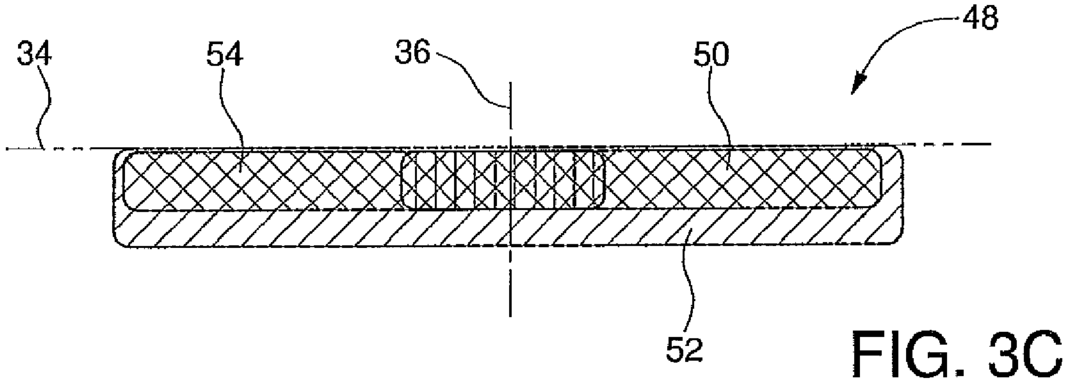
FIG. 3C is a view of another luminous intensity distribution pattern constituting a lighting pattern for a low beam mode formed by irradiating light from a third optical device.

As example, the low beam lighting pattern may include a plurality of luminous intensity distribution patterns 38, 40, 48, as shown in FIGS. 3*a*, 3*b*, and 3*c*. The luminous intensity distribution patterns 38, 40, 48 are shown with a horizontal line 34 representing a horizon and a vertical line 36 representing a horizontal center of the low beam lighting pattern. As a non-limiting example, light irradiated from at least one of the optical devices 16, 18, 20 of the first optical system 15 provides a stepped cut-off low beam pattern, as shown in FIG. 3*a*. As another example, light irradiated from at least one of the optical devices 16, 18, 20 provides a plurality of first "hot spot" distributions 42, 44, 46, as shown in FIG. 3*b*. As a further example, light irradiated from at least one of the optical devices 16, 18, 20 provides a plurality of second "hot spot" distributions 50, 52, 54, as shown in FIG. 3*c*. The "hot spot" distributions are described in applicant's co-pending U.S. Pat. Appl. Pub. Nos. 2007/0236952 and 2006/0262551, each hereby incorporated herein by reference in its entirety. However, it is understood that the first optical system 15 may be adapted to provide any lighting pattern forming any luminous intensity distribution, as desired.

In use in a high beam mode, the second light source 22 emits light, which is directed by the second optical system 24 into a second desired lighting pattern. As shown, the second optical system 24 is adapted to provide a lighting pattern consistent with a high beam lighting pattern. However, it is understood that the second optical system 24 may be adapted to provide any lighting pattern, as desired.

The headlamp 10 according to the present invention provides a direct one-for-one replacement for a seven inch headlamp, thereby militating against costly and impractical modification to a vehicle or the headlamp 10. The headlamp 10 facilitates an efficient and economical operation in both the low beam mode and the high beam mode.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A headlamp for a vehicle comprising:

a seven inch round headlamp housing;

a first light source disposed along a central axis of the housing adapted to be coupled to a source of electrical energy;

a second light source disposed adjacent an inner perimeter of the housing adapted to be coupled to a source of electrical energy;

a first optical system disposed adjacent the first light source, wherein the first optical system includes a trough reflector, a contour of the trough reflector cooperating with light emitted from the first light source to provide at least a portion of a first light distribution pattern;

a second optical system disposed adjacent the second light source, wherein the second optical system cooperates with the second light source to provide a second light distribution pattern different than the first light distribution pattern; and a cover lens coupled to the housing for enclosing the first light source, the second light source, the first optical system, and the second optical system within the housing.

2. The headlamp according to claim 1, wherein each of the first light source and the second light source are each LEDs.

3. The headlamp according to claim 1, wherein the second optical system includes at least one of a reflector, a condenser lens, a projector lens, direct lens, and near field lens.

4. The headlamp according to claim 1, further comprising a thermal management device disposed on the housing.

* * * * *